United States Patent
Fetzer et al.

(10) Patent No.: US 10,816,512 B2
(45) Date of Patent: Oct. 27, 2020

(54) INSPECTION OF A STRUCTURE WITH A SLOPED BACK WALL

(71) Applicant: The Boeing Company, Chicago, IL (US)

(72) Inventors: Barry A. Fetzer, Renton, WA (US); Vicki Wu, Seattle, WA (US); Terrace G. McClure, Mercer Island, WA (US); Jonathan W. Bell, Seattle, WA (US); Kevin J. Mandt, Kent, WA (US)

(73) Assignee: The Boeing Company, Chicago, IL (US)

( * ) Notice: Subject to any disclaimer, the term of this patent is extended or adjusted under 35 U.S.C. 154(b) by 213 days.

(21) Appl. No.: 15/940,701

(22) Filed: Mar. 29, 2018

(65) Prior Publication Data
US 2019/0302062 A1 Oct. 3, 2019

(51) Int. Cl.
*G01N 29/11* (2006.01)
*G01N 29/265* (2006.01)
*G01N 29/26* (2006.01)
*E04F 11/00* (2006.01)

(52) U.S. Cl.
CPC .......... *G01N 29/262* (2013.01); *G01N 29/11* (2013.01); *G01N 29/265* (2013.01); *E04F 11/002* (2013.01); *G01N 2291/106* (2013.01); *G01N 2291/2638* (2013.01)

(58) Field of Classification Search
CPC .. G01N 29/11; G01N 29/4427; G01N 29/262; G01N 29/4418; G01N 29/265; G01N 2291/2638; G01N 2291/106
USPC .......................................................... 73/602
See application file for complete search history.

(56) References Cited

U.S. PATENT DOCUMENTS

| | | | |
|---|---|---|---|
| 9,366,655 B2 | 6/2016 | Hutchinson et al. | |
| 9,500,627 B2 | 11/2016 | Fetzer et al. | |
| 2003/0092989 A1* | 5/2003 | Aichhorn | A61B 8/08 600/443 |
| 2007/0056373 A1* | 3/2007 | Fischer | G01N 29/07 73/609 |
| 2013/0031979 A1* | 2/2013 | Bergman | G01N 29/043 73/599 |
| 2014/0305220 A1* | 10/2014 | Fetzer | G01N 29/262 73/629 |
| 2016/0258905 A1 | 9/2016 | Hutchinson et al. | |
| 2019/0154561 A1* | 5/2019 | Tat | G01N 15/088 |

OTHER PUBLICATIONS

Tat et al., "Ultrasonic Inspection of a Structure with a Ramp," U.S. Appl. No. 15/821,665, 41 pages.

* cited by examiner

*Primary Examiner* — Jacques M Saint Surin
(74) *Attorney, Agent, or Firm* — Yee & Associates, P.C.

(57) ABSTRACT

A signal is sent into a first surface of a structure at an angle relative to the first surface of the structure using a transducer array, wherein the structure has a second surface with a portion non-parallel to the first surface. An ultrasound response signal is formed at the portion of the second surface of the structure. The ultrasound response signal is received at the transducer array.

20 Claims, 7 Drawing Sheets

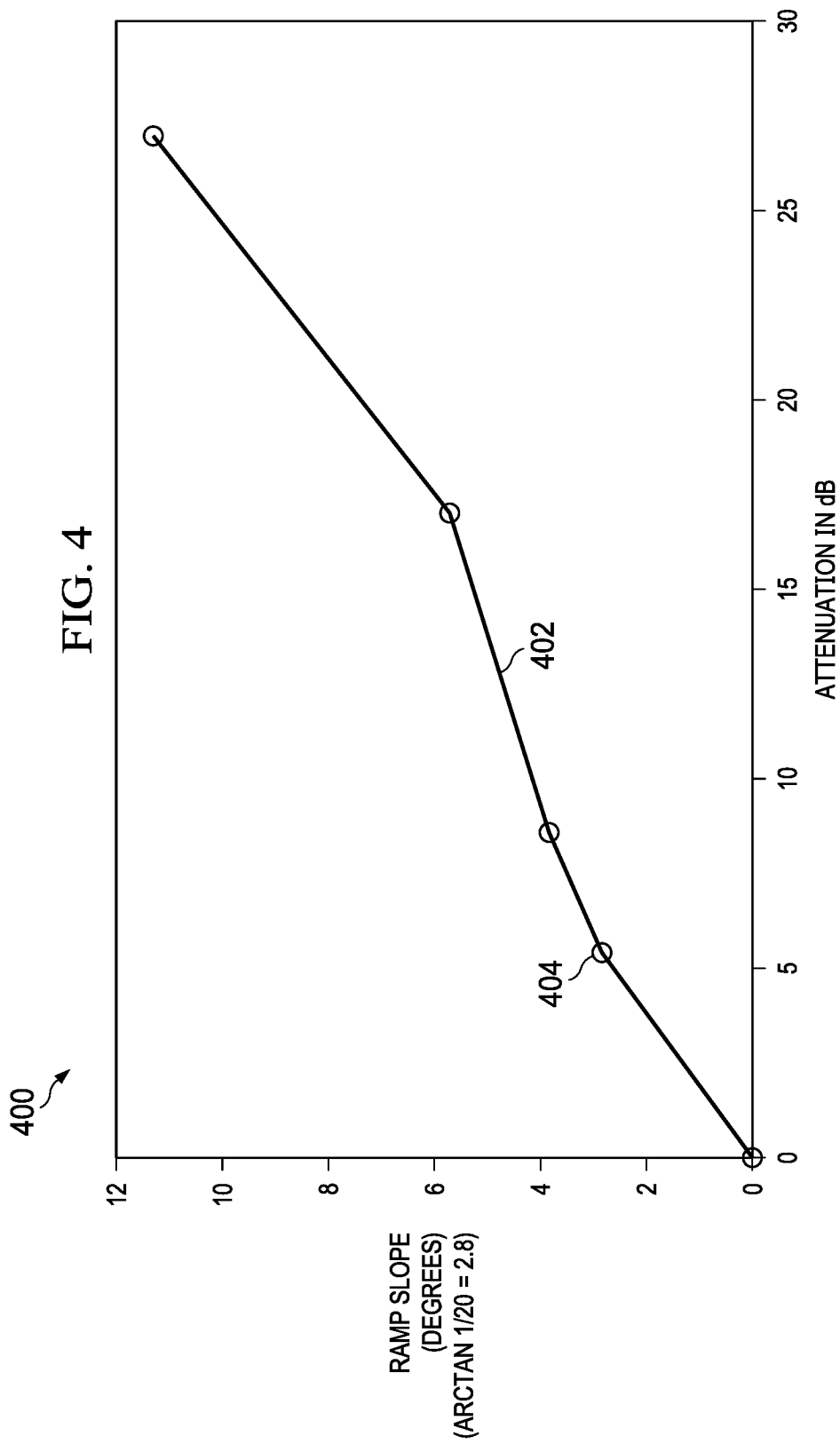

INSPECTION OF A STRUCTURE WITH A SLOPED BACK WALL

BACKGROUND INFORMATION

1. Field

The present disclosure relates generally to inspecting structures and, more specifically, to structures with ramps. Yet more specifically, the present disclosure presents methods for ultrasonic inspection of a structure with a ramp in the back wall of the structure.

2. Background

Ultrasound is a non-destructive inspection method used in the inspection of structures, including composite structures. Ultrasonic inspections send ultrasonic signals into a structure and analyze ultrasonic ultrasound response signals to inspect the structure.

Ultrasonic inspection is sensitive to structural geometry. To inspect a structure using ultrasound, it is desirable for the front surface and back surface of the structure to be parallel to each other. For ultrasonic inspection, it is desirable for the front surface and the back surface to be substantially smooth.

Structural designs having non-parallel surfaces or high surface roughness may be undesirably difficult to inspect with traditional ultrasonic inspection techniques. Therefore, it would be desirable to have a method and apparatus that take into account at least some of the issues discussed above, as well as other possible issues.

SUMMARY

An illustrative embodiment of the present disclosure provides a method. A signal is sent into a first surface of a structure at an angle relative to the first surface of the structure using a transducer array, wherein the structure has a second surface with a portion non-parallel to the first surface. An ultrasound response signal is formed at the portion of the second surface of the structure. The ultrasound response signal is received at the transducer array.

Another illustrative embodiment of the present disclosure provides a method. An initial ultrasound response signal formed at a portion of a second surface of a structure is received at a transducer array, wherein the portion of the second surface is non-parallel to a first surface of the structure. An attenuation of the initial ultrasound response signal is determined. A slope of the portion of the second surface is determined using the attenuation. A signal is sent into the first surface of the structure at an angle relative to the first surface of the structure using the transducer array, wherein the angle of the signal is selected based on the slope.

Yet another illustrative embodiment of the present disclosure provides a method. A portion of the second surface of a structure is determined to be sloped relative to a first surface of the structure. An angle at which to send an ultrasonic signal into the first surface of the structure to inspect the structure is selected in response to determining the portion of the second surface is sloped.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 4 is an illustration of an attenuation vs. slope graph for a composite material in accordance with an illustrative embodiment;

DETAILED DESCRIPTION

Figure 1:
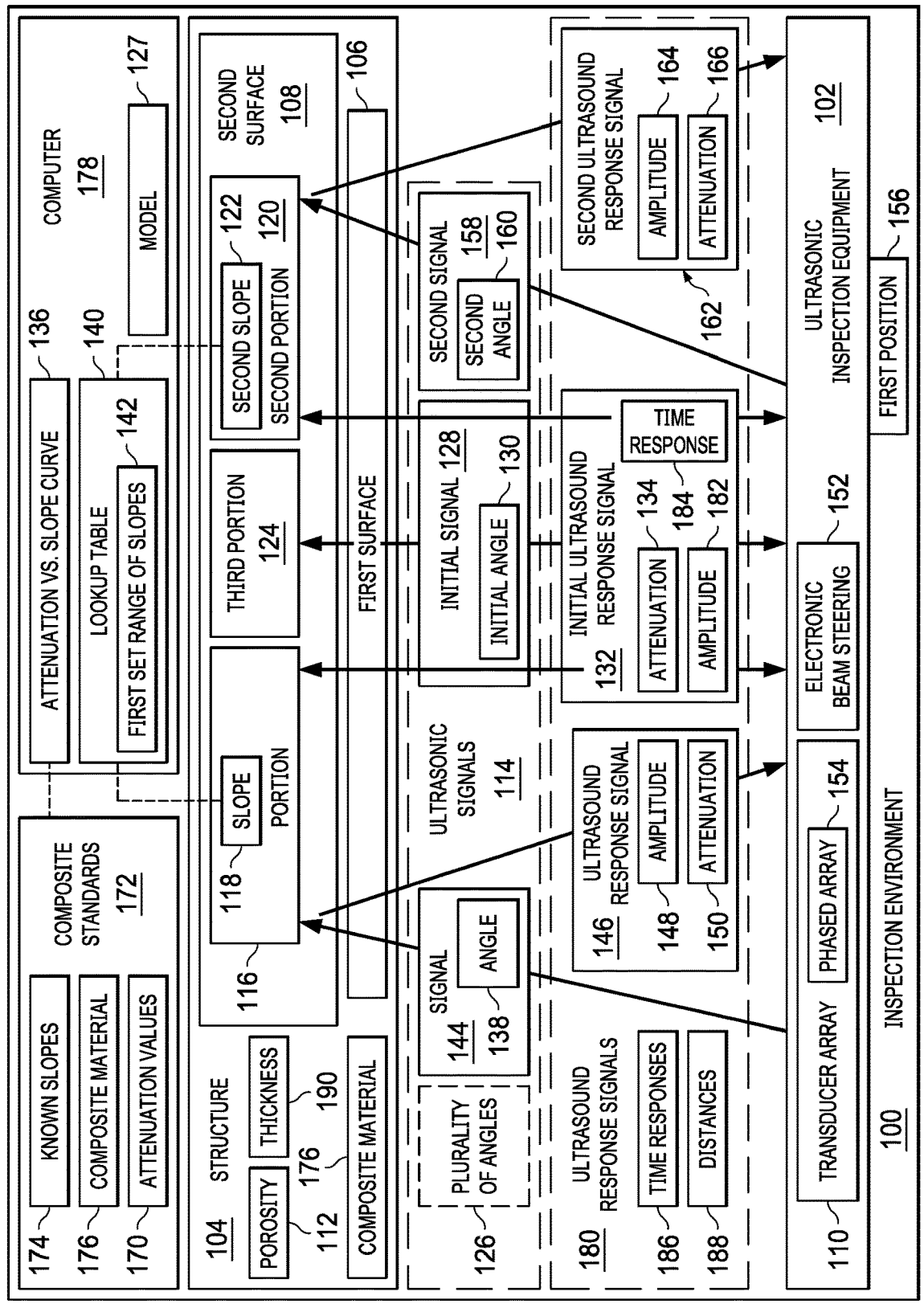
FIG. 1 is an illustration of a block diagram of an environment in which a composite structure is inspected using ultrasonic techniques in accordance with an illustrative embodiment.

The illustrative embodiments recognize and take into account one or more different considerations. For example, the illustrative embodiments recognize and take into account that inspecting porosity in composite structures that are steeply angled/ramped, for example having greater than thirty degrees, is undesirably difficult. The illustrative embodiments recognize and take into account that currently, ply ramp areas that change at a rate less than 20:1 are inspected by conventional methods. Ply ramp areas that change at a rate less than 20:1 change at a rate less than three degrees. The illustrative embodiments recognize and take into account that structures with steeper ramps may be desirable.

The illustrative embodiments recognize and take into account that inspection requirements may need to be modified when a ramp in the structure has an angle greater than three degrees. The illustrative embodiments recognize and take into account that modifying inspection requirements may impact the design of the structure. The illustrative embodiments recognize and take into account that increasing inconsistency detection near the ramp can enable improved design of structures.

The illustrative embodiments recognize and take into account that conventional ultrasonic inspections send signals into a structure at an angle substantially perpendicular to the first surface. The illustrative embodiments recognize and take into account that dropping of plies creates the ramped surfaces on the back of the composite structure. The illustrative examples recognize and take into account that the ability to rapidly drop plies may allow for more flexibility in reducing weight from the composite structure. The illustrative embodiments recognize and take into account that the rapid reduction of plies creates ramped surfaces that act as an attenuator to the ultrasound that inspects the panel. The illustrative embodiments recognize and take into account a common method for measuring attenuation is from back wall amplitude response of the reflected ultrasonic wave.

The illustrative embodiments recognize and take into account that in response to the attenuation, the inspection array may be physically tilted relative to the ramp angle. The illustrative embodiments recognize and take into account that tilting relative to the ramp angle may be undesirably difficult to do in production.

The illustrative embodiments recognize and take into account that the ramps in a composite structure may be at unknown locations and orientations in the production environment. The illustrative embodiments recognize and take into account that because ramp locations can be anywhere on the panel, and not relative to a location of a known geometry feature, an operator may have difficulty distinguishing attenuation due to a ramp from attenuation due to inconsistencies such as porosity. The illustrative embodiments recognize and take into account that having the ability to gain insight into causes of attenuation may significantly reduce manufacturing costs due to rework or rejected product.

The illustrative embodiments recognize and take into account that to program robots for scanning precise alignment relative to the ramps may take an undesirable amount of time. The illustrative embodiments recognize and take into account that sensors on both sides of the skin panel operating in a through transmission fashion may be undesirably complex. The illustrative embodiments recognize and take into account that for some structures, through transmission inspection may be undesirably difficult due to restricted access from geometry of the composite structure or geometry of the surrounding structures.

Referring now to the figures and, in particular, with reference to FIG. 1, an illustration of a block diagram of an environment in which a composite structure is inspected using ultrasonic techniques is depicted in accordance with an illustrative embodiment. In inspection environment 100, ultrasonic inspection equipment 102 inspects structure 104. Structure 104 has first surface 106 and second surface 108. To perform inspections of structure 104, ultrasonic inspection equipment 102, in the form of transducer array 110, is positioned relative to first surface 106. To inspect structure 104 for porosity 112, ultrasonic signals 114 are sent into first surface 106.

Second surface 108 may also be referred to as a "back wall" of structure 104. Second surface 108 has portion 116 with slope 118 relative to first surface 106. In some illustrative examples, portion 116 with slope 118 may be referred to as a ramp with an angle relative to first surface 106. When second surface 108 has portion 116 with slope 118, second surface may be referred to as a "sloped back wall."

As depicted, second surface 108 also has second portion 120 with second slope 122 relative to first surface 106. In some illustrative examples, second portion 120 with second slope 122 may be referred to as a second ramp with a second angle relative to first surface 106. In some illustrative examples, second slope 122 is different from slope 118.

As depicted, second surface 108 also has third portion 124. As depicted, third portion 124 is substantially parallel to first surface 106.

Parts of structure 104 between first surface 106 and third portion 124 are inspected for porosity 112 using ultrasonic signals 114. Each of ultrasonic signals 114 has a respective angle. Ultrasonic signals 114 may have any desirable angle of plurality of angles 126 relative to first surface 106. To inspect third portion 124, ultrasonic signals 114 substantially perpendicular to first surface 106 are sent into structure 104.

For example, initial signal 128 having initial angle 130 substantially perpendicular to first surface 106 is sent into structure 104. In response to initial signal 128 reaching third portion 124 of second surface 108, initial ultrasound response signal 132 is formed at third portion 124 of second surface 108. Initial ultrasound response signal 132 formed at third portion 124 of second surface 108 has attenuation 134. Attenuation 134 of initial ultrasound response signal 132 formed at third portion 124 is low enough to provide for evaluation of porosity 112 between first surface 106 and third portion 124.

To inspect parts of structure 104 between portion 116 and first surface 106, ultrasonic signals 114 substantially perpendicular to first surface 106 have undesirable attenuation created by slope 118. To inspect parts of structure between portion 116 and first surface 106, ultrasonic signals 114 having an angle relative to first surface 106 are sent into first surface 106.

A desirable angle to inspect between first surface 106 and portion 116 is related to slope 118 of portion 116. Attenuation of ultrasound response signals from portion 116 is related to slope 118. To determine a desirable angle to send ultrasonic signals 114 into first surface 106, slope 118 is desirably known. In some illustrative examples, slope 118 is known from model 127 of structure 104. In some illustrative examples, slope 118 is determined from inspection of structure 104.

In some illustrative examples, slope 118 is determined using initial signal 128. When initial signal 128 reaches portion 116, initial ultrasound response signal 132 is formed at portion 116. When initial ultrasound response signal 132 is formed at portion 116, attenuation 134 may be undesirable. When attenuation 134 is over a threshold, initial ultrasound response signal 132 may not be sufficient to evaluate porosity 112 between first surface 106 and portion 116.

In one illustrative example, when attenuation 134 is over a threshold, attenuation 134 is used to determine slope 118. In some illustrative examples, slope 118 is determined using attenuation 134 and attenuation vs. slope curve 136.

In another illustrative example, slope 118 is determined using initial signal 128 and other ultrasonic signals of ultrasonic signals 114 sent normal to first surface 106. In this illustrative example, slope 118 is determined by stepping across first surface 106 sending ultrasonic signals 114 substantially normal to first surface 106 into first surface 106.

Each ultrasound response signal of ultrasound response signals 180 received from structure 104 generated from ultrasonic signals 114 normal to first surface 106 has an amplitude and a time (or "time of flight") response. For example, initial ultrasound response signal 132 has amplitude 182 and time response 184. Using time responses 186 of ultrasound response signals 180 that were received from structure 104 generated from ultrasonic signals 114, slope 118 may be determined.

Time responses 186 are used to determine distances 188 traveled by ultrasound response signals 180 in structure 104. Distances 188 are related to thickness 190 of structure 104. Thickness 190 of structure 104 varies because of slope 118 and second slope 122 of second surface 108.

By determining distances 188 across some or all of portion 116, distances 188 may be used to determine slope 118. In these illustrative examples, computer 178 may calculate slope 118 of portion 116 by monitoring the change in distances 188 as transducer array 110 moves relative to first surface 106. By comparing time responses 186 many times around an area, computer 178 can calculate the slope of the ramp, such as slope 118 of portion 116, because it can monitor the change in backwall thickness as transducer array 110 is moving along first surface 106.

After determining slope 118, angle 138 is selected using slope 118. In some illustrative examples, angle 138 is selected using slope 118 and lookup table 140. In some illustrative examples, slope 118 is part of first set range of slopes 142. In some illustrative examples, first set range of slopes 142 each uses angle 138. In these illustrative examples, other ranges of slopes each have its own respective angle.

After determining angle 138, signal 144 having angle 138 is sent into first surface 106. Ultrasound response signal 146 having amplitude 148 and attenuation 150 is formed at portion 116. Angle 138 is configured to reduce attenuation 150 in ultrasound response signal 146 resulting from the sloped surface. Angle 138 is configured to reduce attenuation 150 in ultrasound response signal 146 formed at portion 116 of second surface 108. Angle 138 is configured to produce sufficient amplitude 148 of ultrasound response signal 146 formed at portion 116 of second surface 108 to perform an evaluation of porosity 112 between first surface 106 and portion 116.

Transducer array 110 sends signal 144 into first surface 106 using electronic beam steering 152. Electronic beam steering 152 allows for ultrasonic inspection equipment 102 to send ultrasonic signals 114 with plurality of angles 126 into first surface 106. By providing phased array 154 with electronic beam steering 152, multiple slopes of second surface 108 may be inspected without moving phased array 154. Multiple incident angles can be programmed into phased array 154 to cover multiple ramp rates in a single scan pass.

For example, transducer array 110 may send signal 144 into first surface 106 when transducer array 110 is at first position 156 relative to first surface 106. Afterwards, transducer array 110 may send second signal 158 having second angle 160 into first surface 106 while transducer array 110 is at first position 156 relative to first surface 106.

In some illustrative examples, slope 118 and second slope 122 are different from each other. In some illustrative examples, when slope 118 and second slope 122 are different, angle 138 and second angle 160 are different from each other.

In some illustrative examples, second slope 122 is known from a model of structure 104. In some illustrative examples, second slope 122 is determined from the inspection of structure 104.

In one illustrative example, second slope 122 is determined using initial signal 128. When initial signal 128 reaches second portion 120, initial ultrasound response signal 132 is formed at second portion 120. When initial ultrasound response signal 132 is formed at second portion 120, attenuation 134 may be undesirable. When attenuation 134 is over a threshold, initial ultrasound response signal 132 may not be sufficient to evaluate porosity 112 between first surface 106 and second portion 120.

When attenuation 134 is over a threshold, attenuation 134 is used to determine second slope 122. In some illustrative examples, second slope 122 is determined using attenuation 134 and attenuation vs. slope curve 136.

After determining second slope 122, second angle 160 is selected using second slope 122. In some illustrative examples, second angle 160 is selected using second slope 122 and lookup table 140. In some illustrative examples, slope 118 and second slope 122 are both part of first set range of slopes 142. In some illustrative examples, first set range of slopes 142 each uses angle 138. In these illustrative examples, angle 138 and second angle 160 are the same. In these illustrative examples, other ranges of slopes each has its own respective angle.

After determining second angle 160, second signal 158 having second angle 160 is sent into first surface 106. Second ultrasound response signal 162 having amplitude 164 and attenuation 166 is formed at second portion 120. Second angle 160 is configured to reduce attenuation 166 in second ultrasound response signal 162 formed at second portion 120 of second surface 108. Second angle 160 is configured to produce sufficient amplitude 164 of second ultrasound response signal 162 formed at second portion 120 of second surface 108 to perform an evaluation of porosity 112 between first surface 106 and second portion 120.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

In a non-destructive inspection (NDI) C-scan, areas with undesirable attenuation appear dark. For areas with undesirable attenuation, the areas are too dark to evaluate for porosity. As depicted in FIG. 1, to reduce attenuation 134 from portion 116, structure 104 is scanned again at angle 138 designed for this ramp rate, slope 118.

In order to create attenuation vs. slope curve 136, attenuation values 170 are taken from composite standards 172 designed at specific ramp rates, with known slopes 174. Attenuation values 170 are taken from representative areas with and without ramps. Composite standards 172 and structure 104 are both formed of composite material 176. For each type of composite material, a different attenuation vs. slope curve may be generated.

The illustration of inspection environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, as depicted, each of attenuation vs. slope curve 136, lookup table 140, and model 127 are each depicted in computer system 178. In other illustrative examples, at least one of attenuation vs. slope curve 136, lookup table 140, or model 127 may be present in a separate computer system. In other illustrative examples, model 127 may not be used in inspection environment 100.

Further, the angled lines are depicted only for illustration. The angles shown may not depict desired angles. Additionally, the angles shown may not be accurate refraction angles resulting from Snell's law.

Figure 2:
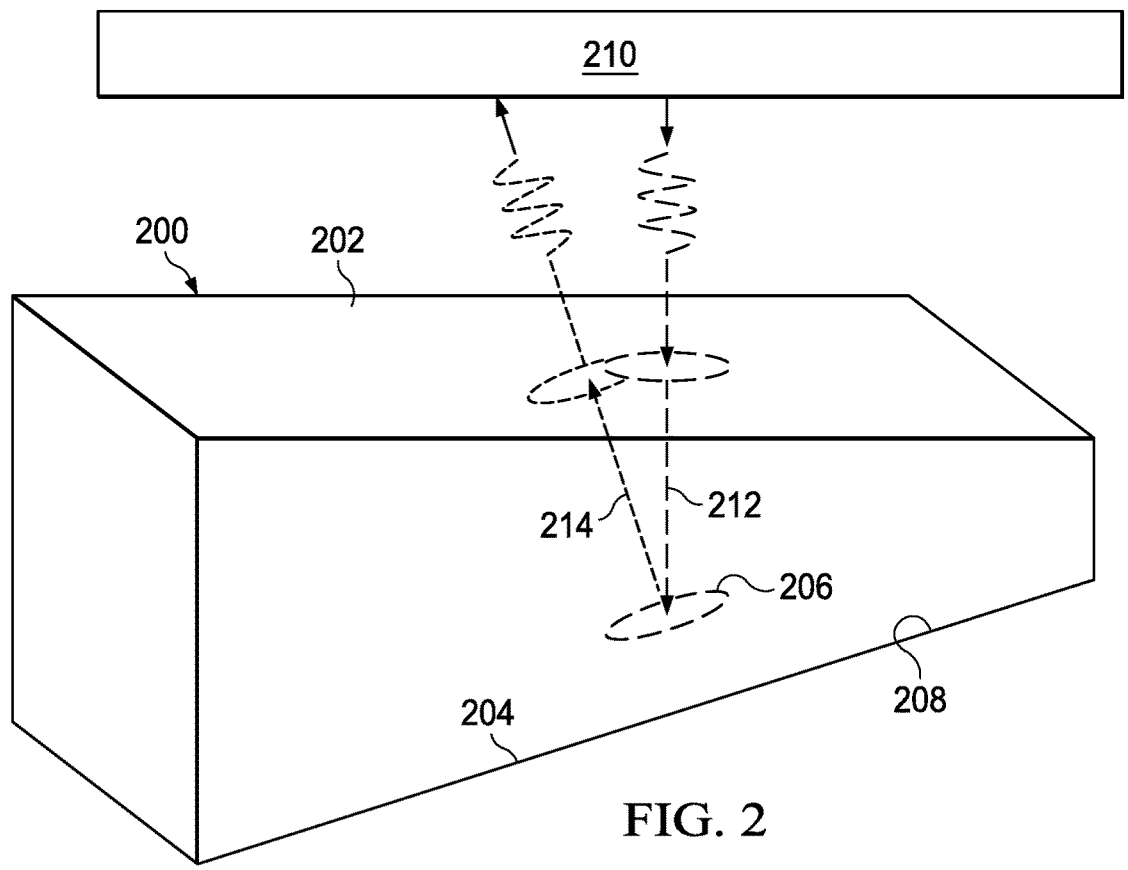
FIG. 2 is an illustration of a projected view of an ultrasonic inspection of a slope of a composite structure in accordance with an illustrative embodiment.

Turning now to FIG. 2, an illustration of a projected view of an ultrasonic inspection of a slope of a composite structure is depicted in accordance with an illustrative embodiment. Structure 200 is a physical implementation of structure 104 of FIG. 1.

Structure 200 has first surface 202 and second surface 204. Portion 206 of second surface 204 has slope 208 relative to first surface 202.

As depicted, transducer array 210 sends initial signal 212 into first surface 202 of structure 200. Initial ultrasound response signal 214 is formed at portion 206 of second surface 204. Initial ultrasound response signal 214 is received at transducer array 210.

Initial ultrasound response signal 214 comes back to transducer array 210 displaced in distance from initial signal 212. This displaced distance causes attenuation and sensitivity loss in the system. In some illustrative examples, the displaced distance in addition to ultrasonic beam spread causes an undesirable amount of attenuation.

In this illustrative example, initial ultrasound response signal 214 will have an undesirable attenuation due to slope 208 of portion 206 of second surface 204. To select a desirable angle for ultrasonic inspection of portion 206, slope 208 is determined.

In some illustrative examples, slope 208 is determined using a model, map, or other design for structure 200. In some illustrative examples, slope 208 is determined using ultrasonic response signals, such as initial ultrasound response signal 214. In some illustrative examples, structure 200 is a wing skin.

In one illustrative example, slope 208 is determined from the attenuation of initial ultrasound response signal 214. In these illustrative examples, the determined attenuation for initial ultrasound response signal 214 is compared to known slope/attenuation relationships for the same type of composite material. In some illustrative examples, the known slope/attenuation relationships are represented by an attenuation vs. slope graph, such as attenuation vs. slope graph 400 of FIG. 4.

In one illustrative example, slope 208 is determined from a response time of initial ultrasound response signal 214. In this illustrative example, the response time of initial ultrasound response signal 214 is compared to response times of other ultrasound response signals as ultrasound signals sent by the transducer array 210 step across first surface 202. By comparing response times of ultrasound response signals, the change in thickness of structure 200 created by slope 208 of second surface 204 may be determined.

Slope 208 may be determined by any desirable method in response to receiving initial ultrasound response signal 214 with undesirable attenuation. After determining slope 208, a desirable angle is selected based on slope 208 of portion 206 of second surface 204.

The illustration of structure 200 in FIG. 2 is not meant to imply physical or architectural limitations to the manner in which an illustrative embodiment may be implemented. For example, second surface 204 may have any desirable angle relative to first surface 202. Further, the angles shown may not depict accurate refraction angles resulting from Snell's law.

Figure 3:
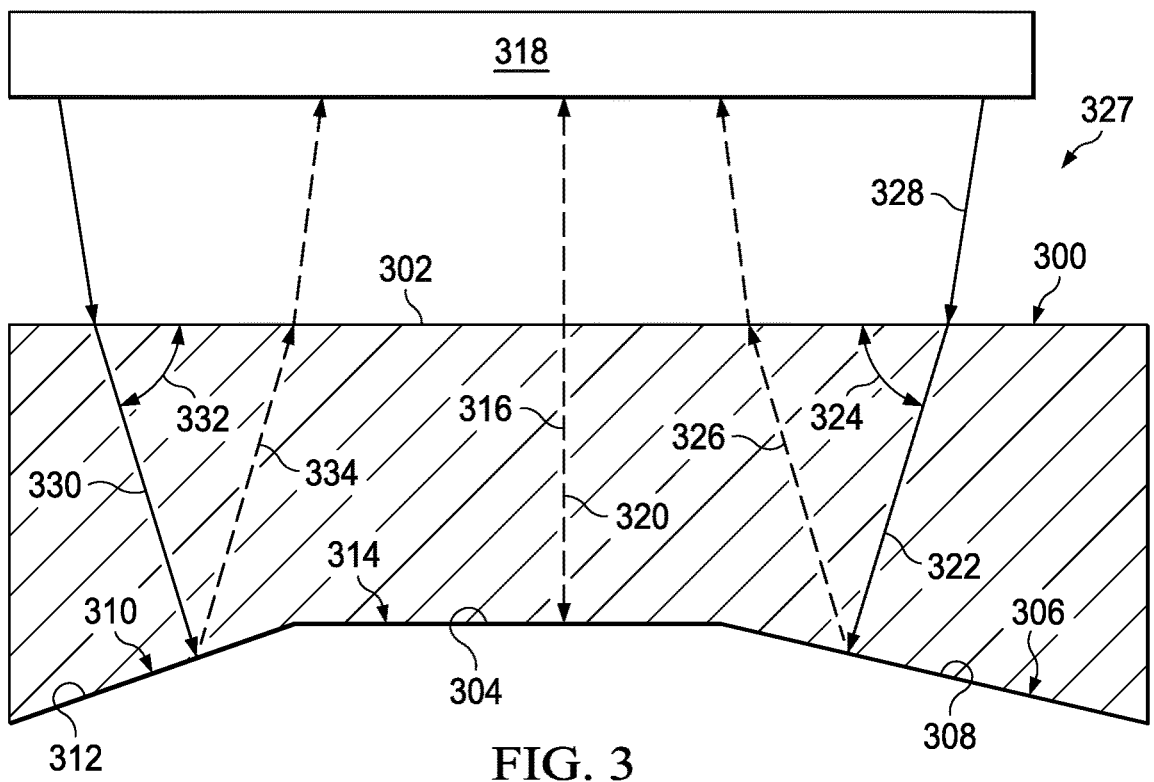
FIG. 3 is an illustration of a cross-sectional view of an ultrasonic inspection of a slope of a composite structure in accordance with an illustrative embodiment.

Turning now to FIG. 3, an illustration of a cross-sectional view of an ultrasonic inspection of a ramp of a composite structure is depicted in accordance with an illustrative embodiment. Structure 300 is a physical implementation of structure 104 of FIG. 1.

Structure 300 has first surface 302 and second surface 304. Portion 306 of second surface 304 is non-parallel to first surface 302. Portion 306 of second surface 304 has slope 308 relative to first surface 302. Second portion 310 of second surface 304 is non-parallel to first surface 302. Second portion 310 of second surface 304 has second slope 312 relative to first surface 302. Structure 300 may be referred to as a structure having two back surface ramps.

Portion 306 may be referred to as a first ramp. Portion 306 results from structure 300 thinning towards the middle of structure 300. Second portion 310 may be referred to as a second ramp. Second portion 310 results from structure increasing in thickness moving away from the middle of structure 300. In some illustrative examples, structure 300 is a wing skin.

Third portion 314 of second surface 304 is substantially parallel to first surface 302. Portions of structure 300 between first surface 302 and third portion 314 may be inspected using ultrasonic signals perpendicular to first surface 302.

Initial signal 316 is sent into first surface 302 by transducer array 318. Initial ultrasound response signal 320 is formed at third portion 314 of second surface 304. Initial ultrasound response signal 320 is received at substantially the same location of transducer array 318 as transmission of initial signal 316. Initial ultrasound response signal 320 has a sufficient amplitude to perform a porosity evaluation.

Signal 322 is sent into first surface 302 of structure 300 at angle 324 relative to first surface 302 of structure 300 using transducer array 318. Angle 324 of signal 322 is configured to reduce attenuation in ultrasound response signal 326 formed at portion 306 of second surface 304. Angle 324 of signal 322 is configured to produce a sufficient amplitude of ultrasound response signal 326 to perform a porosity evaluation.

As can be seen in FIG. 3, coupling material 327 couples transducer array 318 to structure 300. Coupling material 327 takes the form of water or any other desirable coupling material. Transducer array 318 sends signal 328 into coupling material 327. When signal 328 reaches first surface 302 of structure 300, signal 328 refracts to cause signal 322 to enter structure 300 at angle 324. Angle of signal 328 is designed so that the refracted angle 324 is normal or incident to the back surface of the parte. Angle 324 is related to the array steering angle for signal 328 by Snell's law. In some illustrative examples, the velocity of coupling material 327 is approximately half the velocity of structure 300. In these illustrative examples, angle 324 is roughly twice the array steering angle of signal 328.

In some illustrative examples, to inspect both ramps, portion 306 and second portion 310, with a single array pass, there are multiple beam steering angles programmed into transducer array 318. When transducer array 318 is programmed with multiple beam steering angles, the number of scan passes needed to inspect structure 300 is reduced. When transducer array 318 is programmed with multiple beam steering angles, the overall throughput time including inspection time for structure 300 may be reduced.

As depicted, transducer array 318 is programmed with a negative angle and a positive angle. Every time transducer array 318 moves a set resolution along structure 300, transducer array is fired multiple times. In one illustrative example, every time transducer array 318 moves a set resolution along structure 300, transducer array 318 is fired at least once to take data from portion 306 and at least once to take data from second portion 310. In another illustrative example, every time transducer array 318 moves a set resolution along structure 300, transducer array 318 is fired at least once to take data from portion 306, at least once to take data from second portion 310, and at least once to take data from third portion 314.

Signal 330 is sent into first surface 302 of structure 300 at angle 332 relative to first surface 302 of structure 300 using transducer array 318. Angle 332 of signal 330 is configured to reduce attenuation in ultrasound response signal 334 formed at second portion 310 of second surface 304. Angle 332 of signal 330 is configured to produce a sufficient amplitude of ultrasound response signal 334 to perform a porosity evaluation.

The illustration of structure 300 in FIG. 3 is not meant to imply physical or architectural limitations to the manner in which an illustrative embodiment may be implemented. For example, second surface 304 may have any desirable number of ramps at any desirable angles relative to first surface 302. Further, the angles shown may not depict accurate refraction angles resulting from Snell's law.

Turning now to FIG. 4, an illustration of an attenuation vs. slope graph for a composite material is depicted in accordance with an illustrative embodiment. Attenuation vs. slope graph 400 is a physical implementation of attenuation vs. slope graph 136 of FIG. 1. As depicted, attenuation vs. slope graph 400 has trend line 402 connecting plurality of points 404. Plurality of points 404 represent data points for known ramp angles. Each of plurality of points 404 are data points of attenuation measurements for the known ramp angles.

Attenuation vs. slope graph 400 is created for a selected composite material. In order to measure a ramp, attenuation values are taken from different ramp standards designed at specific ramp rates. These values are taken from representative areas with and without ramps. Attenuation vs. slope graph 400 is created using the measured attenuation values.

When a structure, such as structure 200 or structure 300, formed of the same composite material as attenuation vs. slope graph 400 is inspected, attenuations for the structure and attenuation vs. slope graph 400 are used to determine slopes. After using attenuation vs. slope graph 400 to determine a slope, the slope is used to determine a desired angle for an ultrasonic signal.

Figure 5A:
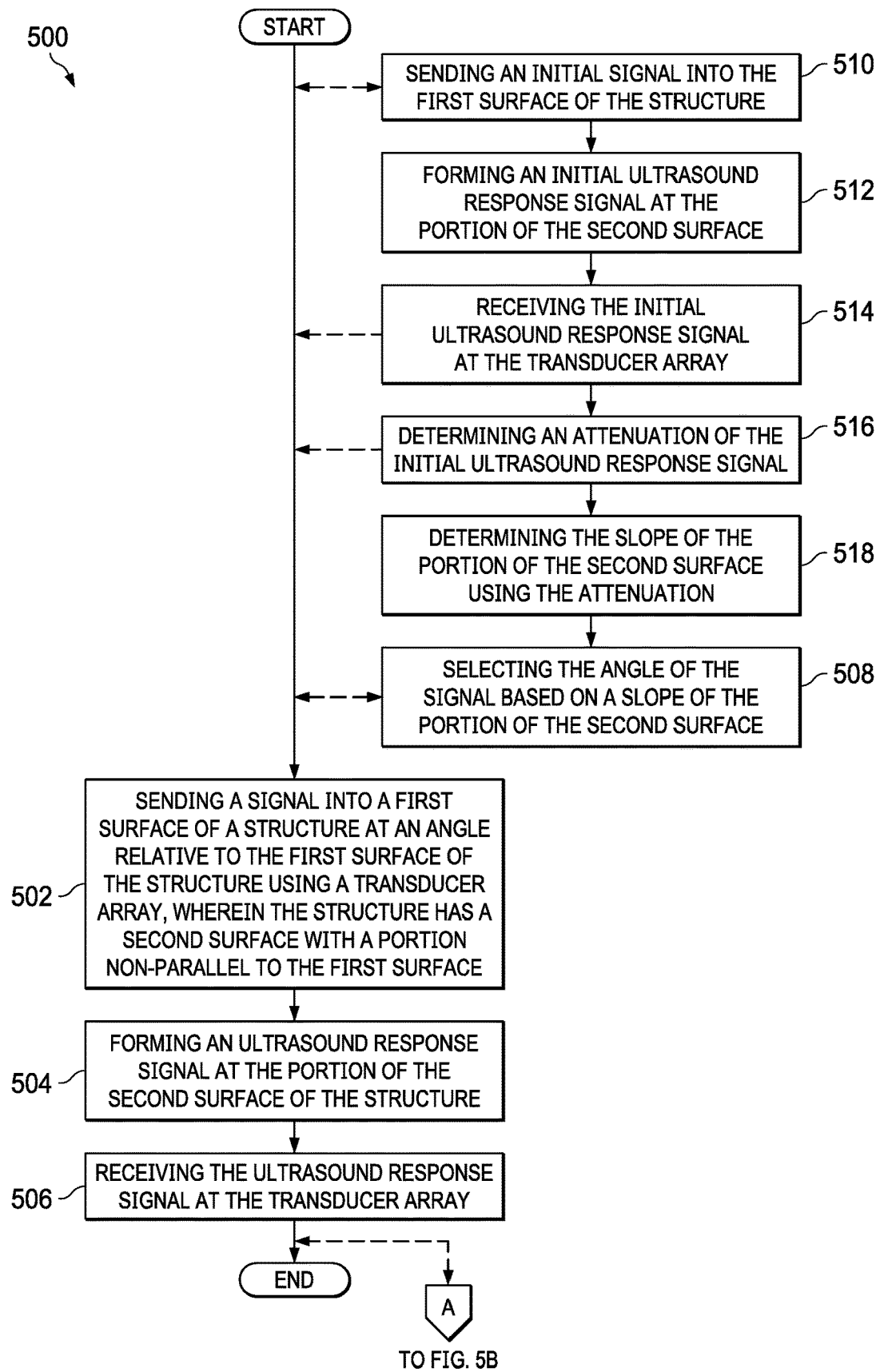
FIGS. 5A and 5B are an illustration of a flowchart of a method for inspecting a structure using ultrasonic techniques in accordance with an illustrative embodiment.
Figure 5B:
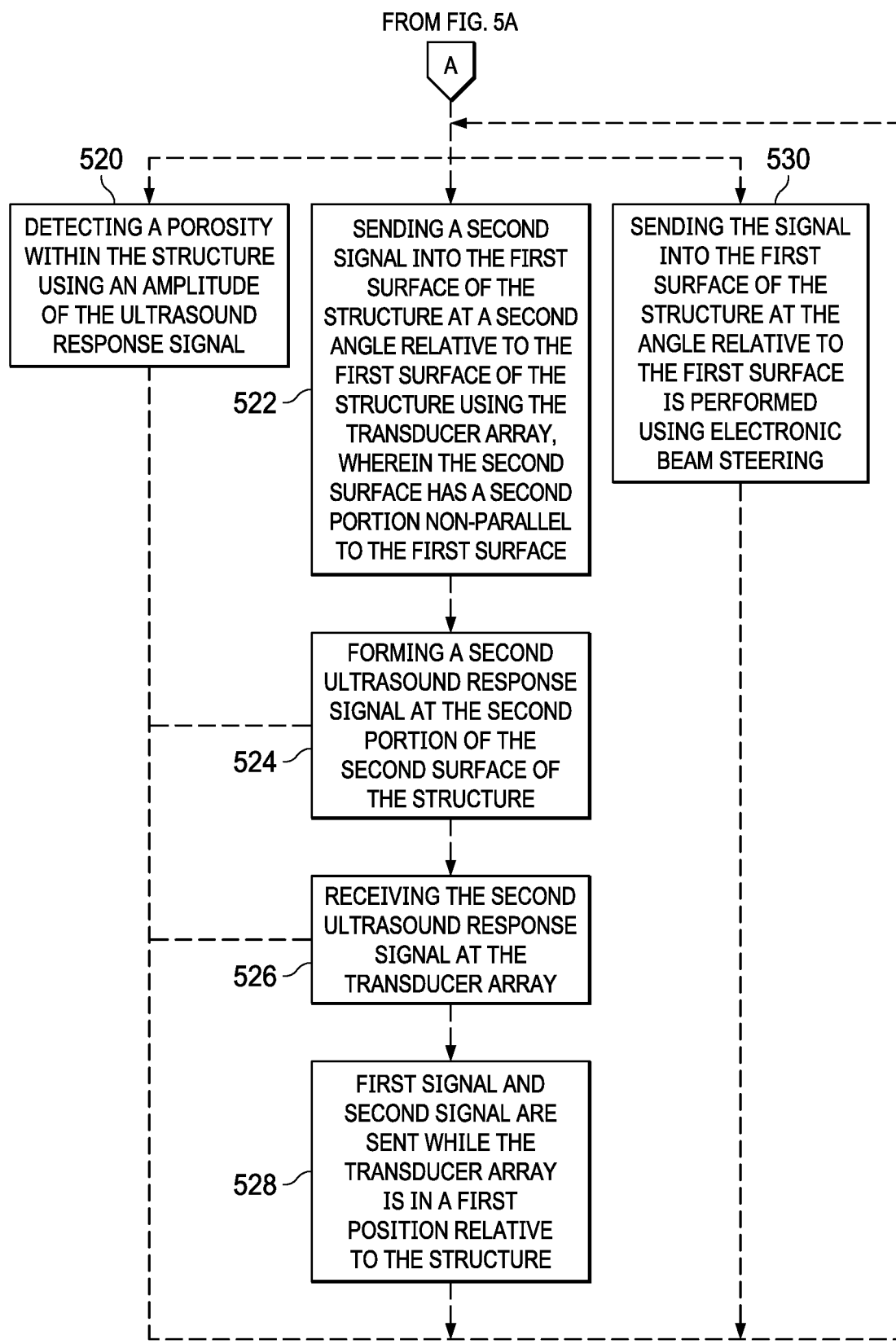

Turning now to FIGS. 5A and 5B, an illustration of a flowchart of a method for inspecting a structure using ultrasonic techniques is depicted in accordance with an illustrative embodiment. Method 500 may be used to inspect structure 104 of FIG. 1. Method 500 may be used to inspect structure 200 of FIG. 2. Method 500 may be used to inspect structure 300 of FIG. 3. Method 500 may be implemented using ultrasonic inspection equipment 102 of FIG. 1.

Method 500 sends a signal into a first surface of a structure at an angle relative to the first surface of the structure using a transducer array, wherein the structure has a second surface with a portion non-parallel to the first surface (operation 502). Method 500 forms an ultrasound response signal at the portion of the second surface of the structure (operation 504). Method 500 receives the ultrasound response signal at the transducer array (operation 506). Afterwards, method 500 terminates.

In some illustrative examples, method 500 selects the angle of the signal based on a slope of the portion of the second surface (operation 508). In some illustrative examples, the angle of the signal is selected from a look-up table. In some illustrative examples, the slope is in a range of slopes and the angle of the signal is for all slopes in the range of slopes.

In some illustrative examples, method 500 sends an initial signal into the first surface of the structure (operation 510). In some illustrative examples, method 500 forms an initial ultrasound response signal at the portion of the second surface (operation 512) In some illustrative examples, method 500 receives the initial ultrasound response signal at the transducer array (operation 514). In some illustrative examples, method 500 determines an attenuation of the initial ultrasound response signal (operation 516). If the attenuation is below a threshold, the initial ultrasound response signal has sufficient strength to evaluate porosity. If the attenuation is above a threshold, the attenuation is undesirable. In some illustrative examples, when the attenuation is above a threshold, method 500 moves to operation 518.

In some illustrative examples, method 500 determines the slope of the portion of the second surface using the attenuation (operation 518). In some illustrative examples, the slope is determined using an attenuation vs. slope graph.

In some illustrative examples, the transducer array is configured to send the initial ultrasound and determine the attenuation automatically. In some illustrative examples, the slope is determined and the angle of the signal to be sent into the first surface is adjusted on the fly.

In some illustrative examples, method 500 detects a porosity within the structure using an amplitude of the ultrasound response signal (operation 520). In these illustrative examples, the angle of the signal is configured to produce a sufficient amplitude of an ultrasound response signal formed at the portion of the second surface to perform a porosity evaluation.

In some illustrative examples, method 500 sends a second signal into the first surface of the structure at a second angle relative to the first surface of the structure using the transducer array, wherein the second surface has a second portion non-parallel to the first surface (operation 522). In some illustrative examples, method 500 forms a second ultrasound response signal at the second portion of the second surface of the structure (operation 524). In some illustrative examples, method 500 receives the second ultrasound response signal at the transducer array (operation 526).

In some illustrative examples, a slope of the portion is different than a second slope of the second portion, and wherein the first angle is different from the second angle. In some illustrative examples, a slope of the portion is different than a second slope of the second portion, wherein the slope and the second slope are within a first set range of slopes, and wherein the first angle and the second angle have the same value selected for the first set range of slopes.

In some illustrative examples, the first signal and second signal are sent while the transducer array is in a first position relative to the structure (operation 528). In some illustrative examples, sending the signal into the first surface of the structure at the angle relative to the first surface is performed using electronic beam steering (operation 530).

Figure 6:
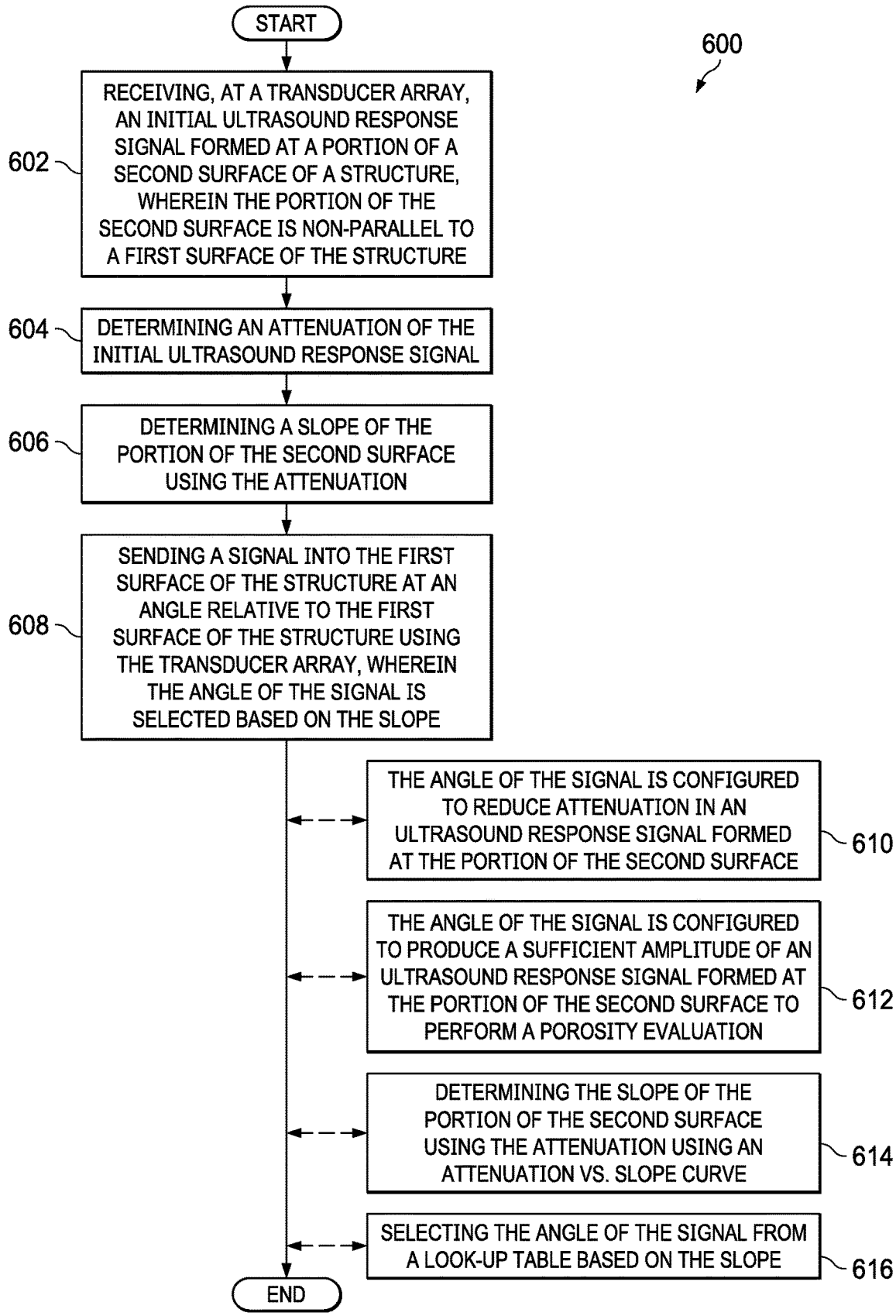
FIG. 6 is an illustration of a flowchart of a method for inspecting a structure using ultrasonic techniques in accordance with an illustrative embodiment.

Turning now to FIG. 6, an illustration of a flowchart of a method for inspecting a structure using ultrasonic techniques in accordance with an illustrative embodiment. Method 600 may be used to inspect structure 104 of FIG. 1. Method 600 may be used to inspect structure 200 of FIG. 2. Method 600 may be used to inspect structure 300 of FIG. 3. Method 600 may be implemented using ultrasonic inspection equipment 102 of FIG. 1.

Method 600 receives, at a transducer array, an initial ultrasound response signal formed at a portion of a second surface of a structure, wherein the portion of the second surface is non-parallel to a first surface of the structure (operation 602). Method 600 determines an attenuation of the initial ultrasound response signal (operation 604). Method 600 determines a slope of the portion of the second surface using the attenuation (operation 606). Method 600 sends a signal into the first surface of the structure at an angle relative to the first surface of the structure using the transducer array, wherein the angle of the signal is selected based on the slope (operation 608). Afterwards, method 600 terminates.

In some illustrative examples, the angle of the signal is configured to reduce attenuation in an ultrasound response signal formed at the portion of the second surface (operation 610). In some illustrative examples, the angle of the signal is configured to produce a sufficient amplitude of an ultrasound response signal formed at the portion of the second surface to perform a porosity evaluation (operation 612).

In some illustrative examples, method 600 determines the slope of the portion of the second surface using the attenuation using an attenuation vs. slope curve (operation 614). In some illustrative examples, method 600 selects the angle of the signal from a look-up table based on the slope (operation 616).

Figure 7:
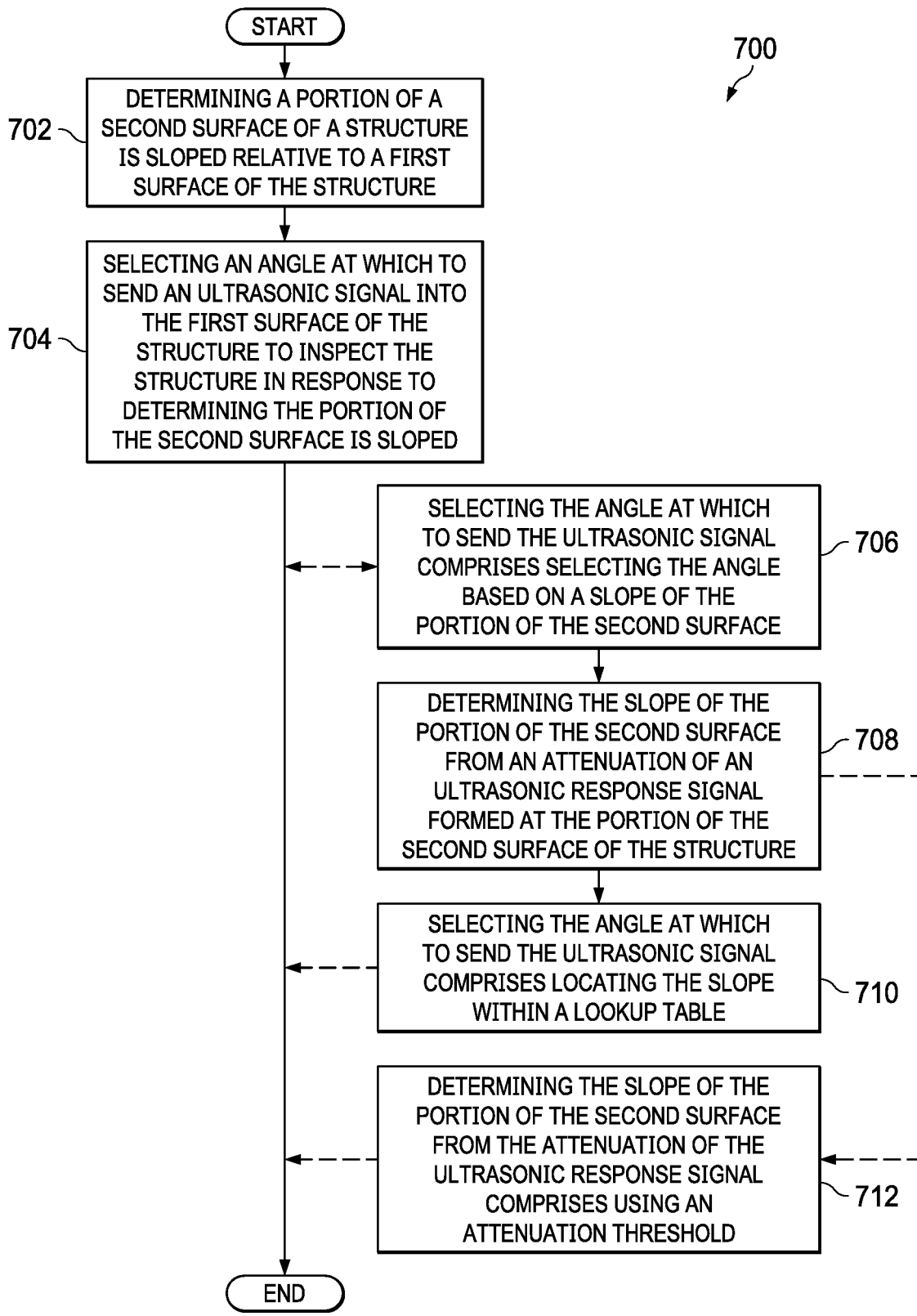
FIG. 7 is an illustration of a flowchart of a method for inspecting a structure using ultrasonic techniques in accordance with an illustrative embodiment.

Turning now to FIG. 7, an illustration of a flowchart of a method for inspecting a structure using ultrasonic techniques is depicted in accordance with an illustrative embodiment. Method 700 may be used to inspect structure 104 of FIG. 1. Method 700 may be used to inspect structure 200 of FIG. 2. Method 700 may be used to inspect structure 300 of FIG. 3. Method 700 may be implemented using ultrasonic inspection equipment 102 of FIG. 1.

Method 700 determines a portion of a second surface of a structure is sloped relative to a first surface of the structure (operation 702). Method 700 selects an angle at which to send an ultrasonic signal into the first surface of the structure to inspect the structure in response to determining the portion of the second surface is sloped (operation 704). Afterwards, method 700 terminates.

In some illustrative examples, selecting the angle at which to send the ultrasonic signal comprises selecting the angle based on a slope of the portion of the second surface (operation 706). In some illustrative examples, the slope of the portion of the second surface is determined using a model, map, or other design for the structure. In some illustrative examples, the slope of the portion of the second surface is determined using at least one ultrasonic response signal. In some illustrative examples, the slope of the portion of the second surface is determined using response times of a plurality of ultrasonic response signals generated as a transducer steps across the structure. In some illustrative examples, method 700 determines the slope of the portion of the second surface from an attenuation of an ultrasound response signal formed at the portion of the second surface of the structure (operation 708).

In some illustrative examples, selecting the angle at which to send the ultrasonic signal comprises locating the slope within a look-up table (operation 710). In some illustrative examples, determining the slope of the portion of the second surface from the attenuation of the ultrasound response signal comprises using an attenuation threshold (operation 712).

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, not all blocks of method 500, method 600, or method 700 are performed. For example, operations 508 through 530 may be optional. In some illustrative examples, operations 520 through 530 are optional. As another example, operations 610 through 616 are optional. As yet another example, operations 706 through 712 are optional.

The illustrative examples decrease ultrasonic attenuation in a composite structure, such as a composite panel, that occurs from back surface ramps. The illustrative examples provide for a single sided inspection using ultrasonic phased array. To decrease ultrasonic attenuation in the ramp areas, the illustrative examples apply a beam steering technique based off the back surface echo response. The illustrative examples allow for multiple beam steers during a single scan pass which enables a rapid inspection time for the NDI cell. The illustrative examples allow for a single sided inspection in the presence of multiple ramps. The illustrative examples present a non-destruction inspection (NDI) method to measure back surface ramps and using this measurement to apply a corrective incidence angle that will reduce ramp attenuation.

In some illustrative examples, a lensed array and electronic beam steering are combined. By using electronic beam steering to incorporate a range of ramp rates, the illustrative examples increase sensitivity to the detection of porosity, foreign material, delaminations, or other inconsistencies in a complex composite structure. The illustrative examples result in reduction of scan time. The illustrative examples also result in increased inspection capability and sensitivity for composite panels. The illustrative examples increase the capability of non-destructive testing techniques to expand inspectable ramp rates.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
   sending a signal into a first surface of a structure at an angle relative to the first surface of the structure using a transducer array, wherein the structure has a second surface with a portion non-parallel to the first surface;
   forming an ultrasound response signal at the portion of the second surface of the structure; and receiving the ultrasound response signal at the transducer array.

2. The method of claim 1 further comprising:
selecting the angle of the signal based on a slope of the portion of the second surface.

3. The method of claim 2 further comprising:
sending an initial signal into the first surface of the structure;
forming an initial ultrasound response signal at the portion of the second surface;
receiving the initial ultrasound response signal at the transducer array; and
determining an attenuation of the initial ultrasound response signal.

4. The method of claim 3 further comprising:
determining the slope of the portion of the second surface using the attenuation.

5. The method of claim 1 further comprising:
detecting a porosity within the structure using an amplitude of the ultrasound response signal.

6. The method of claim 1 further comprising:
sending a second signal into the first surface of the structure at a second angle relative to the first surface of the structure using the transducer array, wherein the second surface has a second portion non-parallel to the first surface;
forming a second ultrasound response signal at the second portion of the second surface of the structure; and
receiving the second ultrasound response signal at the transducer array.

7. The method of claim 6, wherein a slope of the portion is different than a second slope of the second portion, and wherein the angle is different from the second angle.

8. The method of claim 6, wherein a slope of the portion is different than a second slope of the second portion, wherein the slope and the second slope are within a first set range of slopes, and wherein the angle and the second angle have the same value selected for the first set range of slopes.

9. The method of claim 6, wherein the first signal and second signal are sent while the transducer array is in a first position relative to the structure.

10. The method of claim 1, wherein sending the signal into the first surface of the structure at the angle relative to the first surface is performed using electronic beam steering.

11. A method comprising:
receiving, at a transducer array, an initial ultrasound response signal formed at a portion of a second surface of a structure, wherein the portion of the second surface is non-parallel to a first surface of the structure;
determining an attenuation of the initial ultrasound response signal;
determining a slope of the portion of the second surface using the attenuation; and
sending a signal into the first surface of the structure at an angle relative to the first surface of the structure using the transducer array, wherein the angle of the signal is selected based on the slope.

12. The method of claim 11, wherein the angle of the signal is configured to reduce attenuation in an ultrasound response signal formed at the portion of the second surface.

13. The method of claim 11, wherein the angle of the signal is configured to produce a sufficient amplitude of an ultrasound response signal formed at the portion of the second surface to perform a porosity evaluation.

14. The method of claim 11, wherein determining the slope of the portion of the second surface using the attenuation using an attenuation vs slope curve.

15. The method of claim 11 further comprising:
selecting the angle of the signal from a lookup table based on the slope.

16. A method comprising:
determining a portion of a second surface of a structure is sloped relative to a first surface of the structure; and
selecting an angle at which to send an ultrasonic signal into the first surface of the structure to inspect the structure in response to determining the portion of the second surface is sloped.

17. The method of claim 16, wherein selecting the angle at which to send the ultrasonic signal comprises selecting the angle based on a slope of the portion of the second surface.

18. The method of claim 17 further comprising:
determining the slope of the portion of the second surface from an attenuation of an ultrasound response signal formed at the portion of the second surface of the structure.

19. The method of claim 18, wherein selecting the angle at which to send the ultrasonic signal comprises locating the slope within a lookup table.

20. The method of claim 18, wherein determining the slope of the portion of the second surface from the attenuation of the ultrasound response signal comprises using an attenuation threshold.

* * * * *